United States Patent Office 3,405,087
Patented Oct. 8, 1968

3,405,087
STABLE POLYMER DISPERSION IN AN ORGANIC LIQUID AND PROCESS OF PREPARING SAME
Michael Fryd, Willingboro, N.J., assignor to E. I. du Pont de Nemours and Company, Wilmington, Del., a corporation of Delaware
No Drawing. Filed Jan. 29, 1965, Ser. No. 429,110
31 Claims. (Cl. 260—33.6)

ABSTRACT OF THE DISCLOSURE

Stable polymer dispersions in organic liquid prepared by polymerizing a suitable monomer such as a methacrylate in the presence of a graft copolymer one of whose components is soluble in the organic liquid, the other component being insoluble in said liquid and incompatible with the dispersed polymer but soluble in or at least swollen by the monomer from which the dispersed polymer is prepared.

---

This invention relates to stable dispersions of synthetic organic addition polymers in organic liquid media. It is more particularly directed to such stable dispersions containing graft copolymers, to processes for preparing these dispersions, and to coating compositions based on the dispersions.

A highly stable dispersion of an addition polymer in an organic liquid can be prepared according to this invention by polymerizing a suitable monomer or monomers, in the presence of a graft copolymer one of whose components is soluble in the organic liquid medium, the other being insoluble in the liquid and incompatible with the dispersed polymer but soluble in or at least swollen by the monomer from which the dispersed polymer is prepared.

"Component," as it is used here in connection with the description of graft copolymers, means either the backbone polymer or the portion of the copolymer molecule grafted to the backbone.

"Incompatible" describes a graft copolymer component which, when taken by itself and blended with a mass of the polymer to be dispersed, in a mutual solvent, and cast as a film, forms a non-homogeneous product. The non-homogeneity can manifest itself as cloudiness, haziness, stratification or separation of layers.

Dispersions made in this way resist settling for extended periods. This makes them especially useful in preparing coating compositions. By adding pigments and such other conventional components as may be required, one can obtain coating compositions which because of the hardness, toughness and durability of the finishes they produce are suited for finishing appliances, coating paper and for use in strip coating operations. They are especially suited for finishing automobiles and the like.

The dispersions are also useful as intermediates in the manufacture of synthetic fibers and in fabricating polymeric sheet materials.

The dispersed polymer

The dispersed polymer can be any synthetic organic addition polymer which is insoluble in the organic liquid being used. It can, for example, be a homopolymer or copolymer of such ethylenically unsaturated monomers as acrylic acid, methacrylic acid, the amides, nitriles and esters of these, 3-($\beta$-methacryloxyethyl)-2,2-spiro-cyclohexyloxazolidine (MESO), glycidyl methacrylate, tetrahydrofurfuryl methacrylate or acrolein, a so-called "acrylic" polymer.

Polymers and copolymers of such monomers as styrene, $\alpha$-methyl styrene, vinyl toluene, the vinyl- and vinylidene halides, vinyl esters or methylvinyl ketone also serve.

Blends and mixtures of any of these can also be used.

When the dispersions are used to make coating compositions, polymers of methyl methacrylate and copolymers of it with other ethylenically unsaturated monomers are preferred as the dispersed polymers because of the quality of the finishes obtained with them and their low cost. Polymethyl methacrylate is most preferred for the same reason.

The organic liquid medium

The selection of an organic liquid medium for the dispersion is tied to the nature of the polymer to be dispersed. The polymer must, of course, be insoluble in the organic liquid medium, and one of the components of the graft copolymer used must be soluble. The medium must also meet the standards of purity, boiling point, etc., dictated by the intended use of the dispersion. All of this must be kept in mind when the selection is made.

Speaking generally, any organic liquid which fills these requirements will be suitable. Napthenes, gasoline, ketones, aromatic hydrocarbons such as toluene, xylene and benzene, alcohols, esters, ethers, and halogenated solvents such as chloroform, carbon tetrachloride and chlorobenzene are illustrative.

Liquid aliphatic hydrocarbons are preferred because their solvency characteristics suit them for use with the preferred dispersed polymers and graft copolymers. Pentane, hexane, cyclohexane, heptane, octane, mineral spirits, petroleum ethers and mixtures of these are especially preferred because of their availability and their wide range of boiling points and evaporation rates.

The graft copolymers

It has already been explained that one of the components of the graft copolymer must be soluble in the organic liquid medium and that the other must not only be insoluble in this organic liquid, but must also be incompatible with the dispersed polymer and soluble in or at least swollen by the monomer from which the dispersed polymer is prepared.

Speaking broadly, any components filling these requirements are suitable. Since the choice depends primarily on the nature of the dispersed polymer and of the organic liquid medium, and because these are in turn selected according to need, one has only to choose a disperse polymer and an organic liquid medium and select a graft copolymer whose components have the proper solvency characteristics.

In the usual case, the graft copolymer will have a backbone soluble in the organic liquid medium and an insoluble graft portion. This, however, can be switched about and in certain cases it may be desirable to use a graft copolymer whose backbone is insoluble and whose graft portion is soluble.

In either case, the graft copolymer can be prepared with a saturated backbone or an unsaturated backbone, provided of course that the other requirements, already mentioned, are met. "Saturated," in this context, describes a backbone polymer having no remaining olefinic unsaturation. An "unsaturated" backbone polymer is one at least 0.5% of whose monomer units are unsaturated.

If a saturated backbone is desired, it can, for example, be a polymer or copolymer of polyvinyl alcohol or of acrylic or methacrylic acid or their esters, such as 2-ethylhexylacrylate, butyl methacrylate, lauryl methacrylate, stearyl methacrylate, or mixtures of these. The copolymers of these with other ethylenically unsaturated comonomers can also serve as saturated backbones. Such comonomers as methyl methacrylate, methyl acrylate, ethyl acrylate, styrene, MESO, glycidyl methacrylate, maleic anhydride and tetrahydrofurfuryl methacrylate are suitable. The proportions of these monomer units in the backbone polymers can range from 90/10 to 10/90, preferably 75/25 to 33/67.

Linear polymers such as polystyrene, polypropylene, polybutylene or polyisobutylene can also be used. Also suitable for use as saturated backbone polymers are condensation polymers such as polyesters (of dicarboxylic acids and dihydric alcohols), polyamides (of diamines and dicarboxylic acids), polyimides, polyurethanes, polyethers, and polyureas.

If an unsaturated backbone is desired, it can be selected from a large group which includes the butalastic polymers and the polymers, copolymers and terpolymers of the conjugated diolefins (both substituted and unsubstituted) such as the butadienes, chloroprenes and isoprenes, and copolymers of these with isobutylene and copolymerizable monoethylenically unsaturated monomers such as acrylonitrile, acrylic esters, acrylic acid, methacrylic acid, styrene and vinyl toluene. The proportions of these monomer units in the polymers can range from 90/10 to 10/90, preferably 75/25 to 33/67.

Also suitable for use as unsaturated backbones are condensation polymers formed from unsaturated monomers such as itaconic acid, maleic anhydride and unsaturated oil modified alkyd resins.

A variety of grafts can be attached to these backbones. It is necessary only that the grafted portion have solvency characteristics in the organic liquid medium opposite those of the backbone portion. If the graft portion happens to be insoluble in the liquid medium, it must also be incompatible with the dispersed polymer and soluble in or at least swollen by the monomer from which the dispersed polymer is prepared. By keeping these criteria in mind, the selection of a suitable graft portion, given a particular backbone, can easily be made by one skilled in this art. Illustrative of graft portions which can be used are the polymers and copolymers listed under the heading, "The Dispersed Polymer."

These graft copolymers are to be distinguished from those used in the past in the preparation of organosols. In the old methods, the insoluble component of the graft copolymer not only had to be insoluble in the organic liquid medium used to prepare the dispersion, but also had to be compatible with the dispersed polymer, and as a usual matter was the same as the dispersed polymer. This drastically limited the selection of graft copolymer components. Use of graft copolymers according to this invention not only opens new vistas in the selection of insoluble graft copolymer components, but also permits a wider selection of dispersed polymers. When the process of this invention is used, the dispersed polymer and the insoluble component of the graft copolymer must be different. The advantages of this system in terms of flexibility are plain.

In addition, the process of the invention is the only known way of preparing organosols of polymers which are insoluble in the monomers from which they are prepared.

Preparation of the graft copolymers

If a saturated backbone polymer is used in preparing the graft copolmer, the copolymer can be prepared according to procedures more particularly set out in copending U.S. application Ser. No. 383,227, filed July 16, 1964.

According to that method, a graft copolymer is prepared by mixing a suitable saturated backbone polymer with from 10–200%, by weight, of a correspondingly suitable graft monomer, together with from 0.2–5%, by weight, of a peroxide initiator which yields alkoxy or aralkoxy radicals under the reaction conditions. This mixture is then heated to a temperature of from about 80–90° C. until a paste is formed. This paste can be used directly in the preparation of the dispersions of the invention.

If an unsaturated backbone is to be used, it is copolymerized with a suitable grafting monomer according to classical addition polymerization techniques, using the customary free-radical, cationic or anionic initiators such as azobisbutyronitrile, butyl lithium, $BF_3$, benzoyl peroxide and the like. Such initiators are ordinarily used in concentrations of from 1% to 5%, by weight of the total polymer bulk. The copolymerization is carried out in solution, usually in the same organic liquid used in making the dispersion.

In a preferred method, the unsaturated backbone polymer, free radical initiator, organic liquid, and graft monomer are mixed together and then refluxed for ½ hour to 1 hour to form a bluish-white dispersion which can be used directly in preparing the dispersions of the invention.

Preparation of the stable dispersions

The stable polymer dispersions of this invention can be made by polymerizing suitable monomers in the presence of a correspondingly suitable graft copolymer.

One to 20 percent, by weight of the polymer to be dispersed, of a suitable graft copolymer prepared as above, is mixed with the organic liquid to be used as a polymerization medium. It is generally preferred to add from 4 to 10% of the graft copolymer because this amount gives a more stable dispersion.

The monomer or monomers to be polymerized are then added to this mixture, in the desired amount. A free radical polymerization initiator such as benzoyl peroxide or azobisbutyronitrile, in the usual amount, is added to the mixture, which is then heated to bring about the polymerization. The chain length of the polymer being formed can be regulated by chain transfer agents such as, for example, alkyl mercaptans.

The resulting dispersion is a milky fluid containing 10–70% polymer solids and particles having diameters of 0.01 to 2.0 micron. The dispersed polymer will have an average molecular weight, as determined by relative viscosity measurements, of about 5,000–2,000,000.

Preparation of coating compositions

Coating compositions can be prepared directly from these stabilized dispersions by mixing them, in the proper proportions, with conventional coalescing agents and plasticizers. The selection depends on nature of dispersed polymer.

The coalescing agents can by glycol ether esters such as Cellosolve acetate or Carbitol acetate, glycol ethers such as butyl Carbitol or Cellosolve, dimethylacetamide, dimethylformamide, dimethylsulfoxide, N-methylpyrrolidone or hexamethylphosphoramide.

The plasticizers can, for example, be phthalate esters having the general formula

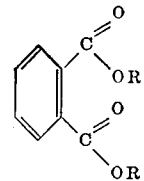

where

R can be an alkyl radical of 1 through 20 carbon atoms, an aliphatic ether or ester radical of 3 through 20 carbon atoms or an alkaryl radical having a total of 7 through 20 carbon atoms.

Pigments can also be added to the dispersions to enhance the aesthetic appeal of the resulting finishes.

The coating compositions are applied by ordinary techniques and are then air-dried or baked at temperatures up to about 200° C. for a period sufficient to drive off the organic liquid. These compositions can be applied to metal, wood, plastic, glass and fabric substrates.

Formulating a coating composition with the dispersions of the invention permits the composition to have a much higher solids content than would be possible were the composition to be based on a true solution. It also permits use of higher molecular weight polymers. These factors, taken together, mean that more film-forming material can be present in the composition without giving it an undesirable viscosity.

EXAMPLES

The following examples show various aspects of the invention in greater detail. It should be understood, however, that these are only illustrative. Other combinations of and variations from the embodiments shown will no doubt occur to those skilled in the art. These are considered to be part of the invention.

All parts are by weight unless otherwise indicated.

EXAMPLE 1

Ten parts of poly(2-ethylhexylacrylate), 10 parts of vinyl acetate, 10 parts of isooctyl benzyl phthalate and 1 part of tertiary butyl perpivalate were thoroughly mixed and heated, under nitrogen, for 16 hours. To the resulting white paste were then added 150 parts of methyl methacrylate monomer, 265 parts of a liquid aliphatic hydrocarbon (boiling point 110–140° C.) and 2 parts of azobisbutyronitrile.

This mixture was heated for 1 hour at 85° C. to give a milky white dispersion containing 40% polymer solids. The polymer particles in this dispersion ranged from 0.3 to 0.5 micron, and the polymer had a molecular weight of about 100,000.

EXAMPLE 2

Ten parts of a 24/76 α-methylstyrene/1,2-butadiene copolymer, 10 parts of methyl methacrylate, 175 parts of a liquid aliphatic hydrocarbon (boiling point 110–140° C.) and 1 part of benzoyl peroxide were thoroughly mixed and heated for ½ hour at 85° C.

To the resulting dispersion were added 100 parts of acrylonitrile (monomer grade), 1 part of benzoyl peroxide and 1 part of dodecyl mercaptan. These were thoroughly mixed and then heated at 62° C. for 1 hour.

The resulting bluish dispersion of polyacrylonitrile contained about 40% solids and had particles ranging from .05 to 2 microns in size. The polymer had a molecular weight of about 85,000.

EXAMPLE 3

Five parts of poly(2-ethylhexylacrylate), 5 parts of methyl methacrylate and ½ part of tertiary butyl perpivalate were mixed thoroughly and then heated at 80° C. for ½ hour to give a white paste.

To this white paste were added 215 parts of a liquid aliphatic hydrocarbon (boiling point 110–140° C.), 1 part of azobisbutyronitrile and 100 parts of styrene. These were mixed thoroughly and heated for 48 hours at 90–95° C., to give a bluish dispersion of polystyrene containing 34% polymer solids and having particles ranging in size from about 0.2 to about 0.5 micron. The relative viscosity of the polymer, measured in ethylene dichloride, was 1.07.

EXAMPLE 4

Five parts of a 24/76 α-methyl styrene/1,2-butadiene copolymer, 5 parts of methyl vinyl ketone, 1 part of benzoyl peroxide and 175 parts of a liquid aliphatic hydrocarbon (boiling point 110–140° C.) were thoroughly mixed and then heated for 10 minutes at 80–85° C.

To the resulting paste were added 100 parts of methyl methacrylate monomer and 1 part of azobisbutyronitrile. These were thoroughly mixed and then heated for 1½ hours at 80–85° C. to give a stable dispersion of poly(methyl methacrylate) containing 39% polymer solids. The polymer had a molecular weight of about 80,000 and the particles in the dispersion ranged from 0.1 to 0.3 micron in size.

EXAMPLE 5

125 parts of the dispersion prepared in Example 1, containing 40% total solids, were mixed with 150 parts of titanium dioxide, 50 parts of butyl benzyl phthalate and 92 parts of mineral spirits. This mixture was stirred until it was smooth, and was then ground in a pebble mill for 18 hours.

139 parts of this mixture were then combined with 138 parts of the poly(methyl methacrylate) dispersion of Example 1, 11 parts of butyl benzyl phthalate and 28 parts of Cellosolve acetate. The mixture was stirred for 5 minutes.

The resulting coating composition was sprayed on a suitably primed automobile. The film was baked at 120° C. for ½ hour to give a glossy, durable finish having excellent reflow properties.

EXAMPLE 6

Ten parts of polymethyl methacrylate, 10 parts of lauryl methacrylate monomer and 1 part of tertiary butyl perpivalate were mixed and then heated for 3 hours at 110° C.

The resulting paste was dispersed in a mixture of 175 parts of a liquid aliphatic hydrocarbon (boiling point 110–140° C.), 140 parts of methyl methacrylate monomer and 2 parts of benzoyl peroxide. This mixture was heated for 3 hours at 85–90° C. to give a stable, milky dispersion of polymethyl methacrylate containing 43.4% total polymer solids and having a relative viscosity, in ethylene dichloride, of 1.12.

EXAMPLE 7

Five parts of "Carbowax" 4000 (a condensate of ethylene glycol, having a molecular weight of about 4000), 5 parts of methyl methacrylate monomer and 0.5 part of tertiary butyl perpivalate were thoroughly mixed and heated at 70° C. for 1½ hours.

The resulting syrup was then dispersed in a mixture of 100 parts of methanol, 50 parts of methyl methacrylate monomer and 1 part of azobisbutyronitrile. This mixture was heated for 3 hours at 65° C. to give a milky dispersion containing 37.5% total polymer solids and having a relative viscosity, measured in ethylene dichloride, of 1.09.

The dispersions made in the foregoing examples resist settling for as long as six weeks at 120° C. and for six months at room temperature. Should slight settling occur, the compositions can be easily redispersed by shaking them briefly.

Coating compositions can be formed from the dispersions of Examples 2 through 7 in the same manner as shown in Example 5.

I claim:
1. A process for preparing, in an organic liquid a stable dispersion of a synthetic organic addition polymer, said process comprising preparing said polymer by polymerization of a suitable monomer in said organic liquid in the presence of from 1–20%, by weight of the polymer to be dispersed, of a graft copolymer having
   (a) a component soluble in said organic liquid, and
   (b) from 10–200%, by weight of the soluble component, of a component insoluble in said organic liquid, incompatible as a homopolymer with said synthetic organic addition polymer, but at least swollen by the monomer from which said organic polymer is prepared.
2. A process for preparing, in an organic liquid, a stable dispersion of a synthetic organic addition polymer, said process comprising preparing said polymer by polymerization of a suitable monomer in said organic liquid in the presence of from 1–20% by weight of the polymer to be dispersed, of a graft copolymer having
   (a) a saturated backbone polymer soluble in said organic liquid, and

(b) from 10–200%, by weight of the backbone polymer, of a graft component insoluble in said organic liquid, incompatible as a homopolymer with said synthetic organic addition polymer, but at least swollen by the monomer from which said organic polymer is prepared.

3. The process of claim 2 wherein the graft component in (b) is of ethylenically unsaturated monomers.

4. The process of claim 2 wherein the saturated backbone polymer in (a) is selected from the group consisting of
   (1) linear hydrocarbon polymers;
   (2) polymers and copolymers of aliphatic esters of acrylic acid with alcohols of 4 through 26 carbon atoms;
   (3) polymers and copolymers of aliphatic esters of methacrylic acid with alcohols of 4 through 26 carbon atoms; and
   (4) copolymers of these esters with other monomers copolymerizable therewith.

5. The process of claim 4 wherein the graft component in (b) is of ethylenically unsaturated monomers.

6. The process of claim 4 wherein the graft component in (b) is of a monomer selected from the group consisting of
   (1) acrylic and methacrylic acids, their amides, nitriles and esters with alcohols of 1 through 3 carbon atoms;
   (2) vinyl esters;
   (3) vinyl halides;
   (4) styrene, α-methyl styrene and vinyl toluene; and
   (5) copolymers of the monomers in (1) through (4) with each other and with other ethylenically unsaturated monomers.

7. The process of claim 2 wherein the saturated backbone polymer in (a) is of 2-ethylhexyl acrylate units and the graft component in (b) is of vinyl acetate units.

8. The process of claim 2 wherein the saturated backbone polymer in (a) is of 2-ethylhexyl acrylate units and the graft component in (b) is of methyl methacrylate units.

9. The process of claim 2 wherein the synthetic organic addition polymer is polymethyl methacrylate, the organic liquid is an aliphatic hydrocarbon, the saturated backbone polymer in (a) is of 2-ethylhexyl acrylate units and the graft component in (b) is of vinyl acetate units.

10. A process for preparing, in an organic liquid, a stable dispersion of a synthetic organic addition polymer, said process comprising preparing said polymer by polymerization of a suitable monomer in said organic liquid in the presence of 1–20%, by weight of the polymer to be dispersed, of a graft copolymer having
    (a) an unsaturated backbone polymer soluble in said organic liquid, and
    (b) from 10–200%, by weight of the backbone polymer, of a graft component insoluble in said organic liquid, incompatible as a homopolymer with said synthetic organic addition polymer, but at least swollen by the monomer from which said organic polymer is prepared.

11. The process of claim 10 wherein the graft component in (b) is of ethylenically unsaturated monomers.

12. The process of claim 10 wherein the unsaturated backbone in (a) is selected from the group consisting of
    (1) polymers and copolymers of conjugated diolefins; and
    (2) copolymers of a conjugated diolefin with a monomer selected from the group consisting of
       (a) isobutylene and
       (b) monoethylenically unsaturated monomers copolymerizable with conjugated diolefins.

13. The process of claim 12 wherein the graft component is of ethylenically unsaturated monomers.

14. The process of claim 12 wherein the graft component is selected from the group consisting of
    (1) acrylic and methacrylic acids, their amides, nitriles and esters with alcohols of 1 through 3 carbon atoms;
    (2) vinyl esters;
    (3) vinyl halides;
    (4) styrene, α-methyl styrene and vinyl toluene; and
    (5) copolymers of the monomers in (1) through (4) with each other and with other ethylenically unsaturated monomers.

15. The process of claim 10 wherein the unsaturated backbone polymer in (a) is of α-methyl styrene and butadiene units in a 24/76 ratio, and the graft component in (b) is of methyl methacrylate units.

16. The process of claim 10 wherein the synthetic organic addition polymer is polyacrylonitrile, the organic liquid is an aliphatic hydrocarbon, the unsaturated backbone polymer in (a) is of α-methyl styrene and butadiene units in a 24/76 ratio, and the graft component in (b) is of methyl methacrylate units.

17. A dispersion of a synthetic organic addition polymer in an organic liquid, the dispersion containing 1–20%, by weight of the synthetic organic addition polymer, of a graft copolymer having
    (a) a component soluble in said organic liquid, and
    (b) from 10–200%, by weight of the soluble component, of a component insoluble in said organic liquid, incompatible as a homopolymer with said synthetic organic addition polymer, but at least swollen by the monomer from which said organic polymer is prepared.

18. A dispersion of a synthetic organic addition polymer in an organic liquid, the dispersion containing 1–20%, by weight of the synthetic organic addition polymer, of a graft copolymer having
    (a) a saturated backbone polymer soluble in said organic liquid, and
    (b) from 10–200%, by weight of the backbone polymer, of a graft component insoluble in said organic liquid, incompatible as a homopolymer with said synthetic organic addition polymer, but at least swollen by the monomer from which said organic polymer is prepared.

19. The dispersion of claim 18 wherein the graft component in (b) is of ethylenically unsaturated monomers.

20. The dispersion of claim 18 wherein the saturated backbone polymer in (a) is selected from the group consisting of
    (1) linear hydrocarbon polymers;
    (2) polymers and copolymers of aliphatic esters of acrylic acid with alcohols of 4 through 26 carbon atoms;
    (3) polymers and copolymers of aliphatic esters of methacrylic acid with alcohols of 4 through 26 carbon atoms, and
    (4) copolymers of these esters with other monomers copolymerizable therewith.

21. The dispersion of claim 20 wherein the graft component in (b) is selected from the group consisting of
    (1) acrylic and methacrylic acids, their amides, nitriles and esters with alcohols of 1 through 3 carbon atoms;
    (2) vinyl esters;
    (3) vinyl halides;
    (4) styrene, α-methyl styrene and vinyl toluene; and
    (5) copolymers of the monomers in (1) through (4) with each other and with other ethylenically unsaturated monomers.

22. The dispersion of claim 18 wherein the saturated backbone polymer in (a) is of 2-ethylhexyl acrylate units and the graft component in (b) is of vinyl acetate units.

23. The dispersion of claim 18 wherein the saturated backbone polymer in (a) is of 2-ethylhexyl acrylate units and the graft component in (b) is of methyl methacrylate units.

24. The dispersion of claim 18 in which the synthetic organic addition polymer is polymethyl methacrylate, the organic liquid is an aliphatic hydrocarbon, the saturated backbone polymer in (a) is of 2-ethylhexyl acrylate units and the graft component in (b) is of vinyl acetate units.

25. A dispersion of a synthetic organic addition polymer in an organic liquid, the dispersion containing from 1–20%, by weight of the synthetic organic addition polymer, of a graft copolymer having
 (a) an unsaturated backbone polymer soluble in said organic liquid, and
 (b) from 10–200%, by weight of the backbone polymer, of a graft component insoluble in said organic liquid, incompatible as a homopolymer with said synthetic organic addition polymer, but at least swollen by the monomer from which said organic polymer is prepared.

26. The dispersion of claim 25 wherein the graft component in (b) is of ethylenically unsaturated monomers.

27. The dispersion of claim 25 wherein the unsaturated backbone in (a) is selected from the group consisting of
 (1) polymers and copolymers of conjugated diolefins, and
 (2) copolymers of a conjugated diolefin with a monomer selected from the group consisting of
  (a) isobutylene and
  (b) monethylenically unsaturated monomers copolymerizable with conjugated diolefins.

28. The dispersion of claim 27 wherein the graft component in (b) is of ethylenically unsaturated monomers.

29. The dispersion of claim 27 wherein the graft component in (b) is selected from the group consisting of
 (1) acrylic and methacrylic acids, their amides, nitriles and esters with alcohols of 1 through 3 carbon atoms;
 (2) vinyl esters;
 (3) vinyl halides;
 (4) styrene, α-methyl styrene and vinyl toluene; and
 (5) copolymers of the monomers in (1) through (4) with each other and with other ethylenically unsaturated monomers.

30. The dispersion of claim 25 wherein the unsaturated backbone polymer in (a) is of α-methyl styrene and butadiene units in a 24/76 ratio, and the graft component in (b) is of methyl methacrylate units.

31. The dispersion of claim 25 in which the synthetic organic addition polymer is polyacrylonitrile, the organic liquid is an aliphatic hydrocarbon, the unsaturated backbone polymer in (a) is of α-methyl styrene and butadiene units in a 24/76 ratio, and the graft component in (b) is of methyl methacrylate units.

References Cited
UNITED STATES PATENTS

| | | |
|---|---|---|
| 3,232,903 | 2/1966 | Schmidle et al. _____ 260—33.6 |
| 3,166,524 | 1/1965 | Schmidle et al. _____ 260—33.6 |
| 3,095,388 | 6/1963 | Osmond et al. _____ 260—33.6 |

ALAN LIEBERMAN, *Primary Examiner.*